Aug. 8, 1972

J. B. HICKS 3,682,608

PRECOMBUSTION CATALYTIC DEVICE FOR USE IN A SPARK IGNITION
INTERNAL COMBUSTION ENGINE EMPLOYING A VAPORIZABLE
LIQUID HYDROCARBON FUEL
Filed Jan. 15, 1971

INVENTOR.
J. Byron Hicks
BY

ATTORNEYS

United States Patent Office 3,682,608
Patented Aug. 8, 1972

3,682,608
RECOMBUSTION CATALYTIC DEVICE FOR USE IN A SPARK IGNITION INTERNAL COMBUSTION ENGINE EMPLOYING A VAPORIZABLE LIQUID HYDROCARBON FUEL
J. Byron Hicks, 48 Glenwood Road, Colts Neck, N.J. 07722
Continuation-in-part of application Ser. No. 6,858, Jan. 29, 1970. This application Jan. 15, 1971, Ser. No. 106,734
Int. Cl. B01f 3/02; F02m 17/00
U.S. Cl. 48—180 R
24 Claims

ABSTRACT OF THE DISCLOSURE

A catalytic device for preconditioning a carbureted mixture of a volatilizable hydrocarbon liquid fuel and air, the mixture to be fed to the intake of a spark ignition internal combustion engine. The catalyzer which in the prior art was carried by coarse mesh screens of planar configuration is in the instant invention carried by fine mesh wire cloths of deep dish configuration which provide longer surface contact between the mixture and the catalyzer, and create tortuous flow passages for the carbureted mixture thereby lengthening the time of exposure to the catalytic surfaces and also by scrubbing the catalytic surfaces reduce the thickness of the catalytic-impeding gaseous static boundary layers at said surfaces.

CROSS-REFERENCE TO RELATED APPLICATION

This application is a continuation in part of application Ser. No. 6,858, filed Jan. 29, 1970, and now abandoned, for Precombustion Catalytic Device for Use in a Spark Ignition Internal Combustion Engine Employing a vaporizable Liquid Hydrocarbon Fuel.

BACKGROUND OF THE INVENTION

(1) Field of the invention

A device which through catalytic action on a carbureted mixture of a volatilizable liquid hydrocarbon fuel and air just prior to introduction into the intake of a spark ignition internal combustion engine preconditions the mixture for more efficient ignition whereby to reduce the minimum octane number of the fuel required to prevent knocking, clean up existing carbon deposits in the combustion chamber of the engine and reduce air pollutants.

(2) Description of the prior art

In United States Letters Patent No. 2,899,949 issued Aug. 8, 1959 for a Device for Improving the Operation of Internal Combustion Engines there is disclosed a catalytic preconditioner interposed between a carburetor and an engine intake. This preconditioner constituted a pair of 8 to 10 mesh screens of planar configuration spaced slightly apart and each coated with a different hydrogen ion forming catalyst, specifically cadmium and nickel. Said device, although giving noticeably improved results in that it permitted the use of lower octane rating for the fuel without increasing preignition, did not fully realize all of the advantages which might be obtained by use of the new principle therein disclosed. Thus in this patent the wire screens were of a coarse nature of 8 to 10 mesh because of which the openings defined by the wires were quite large. It was not realized until now that these large sizes limited the amount of catalytic preconditioning. Moreover, due to the planarity of the screens, the full faces of the openings were presented squarely to the carbureted fuel/air mix that flowed therethrough and for a given size carburetor throat supplied the minimum area of screen. As a result of these two parameters, i.e. coarse screen size and planarity of the screens, the structure disclosed in the aforesaid patent achieved considerably less than the full potential of the invention.

Other problems caused by the specific structure of this prior preconditioning device were that due to planarity and coarse screens the area of the catalyst presented to the fuel/air carbureted stream was minimal as to each portion of the wires of the screens. There was a minimum of turbulence and the scrubbing action of the stream on the screens was minimal so that the static boundary layer between the moving stream and the stationary screen was of appreciable thickness preventing a high efficiency of catalysis.

SUMMARY OF THE INVENTION

The present invention represents a substantial improvement over a highly sophisticated modification of the previously patented invention in that pursuant to the present invention the preconditioner which still is located in the same position as the original preconditioner is so constructed as to substantially enhance the catalytic hydrogen ion forming effect. It does this by (a) providing additional catalytic surfaces within any available throat area of an intak manifold, (b) by reducing the size of the catalytic surfaces openings through which the fuel/air mixture flows, this being accomplished by eliminating the coarse wire mesh and substituting a wire cloth the openings of which are much smaller than those of the coarse mesh, the cloth being coated with a catalyst, (c) by so shaping the preconditioner that the fuel/air mixture must flow in a more tortuous passage than it did in the patented device whereby substantially all of the fuel is exposed to the catalytic surfaces, (d) by so shaping the preconditioner in a non-planar configuration that there is a larger overall area of preconditioner for any given size of bore and that there are essentially no passageways squarely facing the line of flow of the fuel/air mixture through the intake pipe but rather so that the fuel/air mixture must turn about portions of the catalytic surfaces so not only as to create turbulence but so as to lengthen the period of exposure of the mixture to the catalytic surfaces, and (e) by enhancing the scrubbing action of the fuel/air mixture on the catalytic surfaces so as to materially reduce the thickness of the static boundary layer that normally is present at any interface between a moving fluid and a solid in the path of the fluid, reduction of the static boundary layer leading to an enhanced catalytic effect.

From the foregoing it will be seen that it is a general object of the present invention to provide a precombustion catalytic device of the character described which is superior to the device disclosed in the issued patent.

It is another object of the invention to provide a precombustion catalytic device of the character described which provides a catalytic surface on a carrier element of a wire cloth type so as to present at least one smaller order of magnitude of size, i.e. a decrease of at least one-tenth, for the openings through which the fuel/air mixture flows.

It is another object of the invention to provide a precombustion catalytic device of the character described having a non-planar configuration such that even the much smaller openings presented by the wire cloth are further effectively reduced in size by so orienting the great majority of the openings that they are non-perpendicular to the longitudinal axis of the carburetor outlet and the intake of the internal combustion engine.

It is another object of the invention to provide a precombustion catalytic device of the character described having a non-planar configuration which thereby offers a larger overall area for any given size of bore.

It is another object of the invention to provide a precombustion catalytic device of the character described which will effect a very material reduction in octane number, ranging, for example, from 5 to 11, which can be used by a spark ignition internal combustion engine without causing preignition, i.e. rumbling, thudding or detonation.

It is another object of the invention to provide a precombustion catalytic device of the character described which enables an old engine to be rather rapidly cleansed of previous internal carbon deposits which increase the compression ratio and make the engine prone to preignition and which cleans up carbon deposits on the spark plugs to thereby eliminate a major cause of exhaust pollutants.

It is another object of the invention to provide a precombustion catalytic device of the character described which enables a spark ignition internal combustion engine to be adjusted without deleterious effects by advancing the spark a substantial amount, e.g. as much as 10°, and/or leaning the fuel/air mixture to as much as 5% over the stoichiometric value for the air, all of these adjustments normally tending toward preignition but being desirable because they increase engine efficiency, reduce exhaust pollutants and lessen the tendency to encourage smog.

It is another object of the invention to provide a precombusion catalytic device of the character described which will enable the acceleration pump on the carburetor to reduce enrichment of fuel and thereby further reduce air pollutants and the tendency to encourage smog.

It is another object of the invention to provide a precombustion catalytic device of the character described which, generally speaking, enables the engine and carburetor to be so regulated in their functions that (a) the amount of unburned hydrocarbons is greatly reduced or eliminated, (b) the amount of carbon monoxide is greatly decreased with concurrent increase in carbon dioxide and (c) will reduce or eliminate the formation of nitrous oxide, whereby the engine will run at a greater efficiency with less tendency to form carbon deposits and with the emission of less noxious pollutants to the atmosphere.

In an engine without the present invention, regular gasoline, i.e. a gasoline with about a 94 octane rating, can only be used in spark ignition internal combustion engines having up to about a 9 to 1 compression ratio without creating preignition. At 9½ to 1 compression ratio and higher it has been necessary in such engines to use a premium gasoline, i.e. of 99 to 100 octane or better; it is an object of the present invention to provide a precombustion catalytic device of the character described which will enable an engine of the character described with a compression ratio as high as 10½ to 1 to function without preignition and without any of the other mentioned drawbacks on a gasoline with an octane number as low as 94.

It is another object of the invention to provide a precombustion catalytic device of the character described which because of its ability to enable a spark ignition internal combustion engine to run on fuels of such low octane numbers without preignition or any of the other mentioned drawbacks makes it possible, if gasoline blenders so desire it, to provide for general consumption, gasolines devoid of antiknocking agents such as lead-containing compounds which form noxious pollutants in the exhaust gas and which form lead deposits in the engine; in other words, to enable lead compounds to be reduced in or eliminated from commercial gasoline blends. Compounds of this nature heretofore having been incorporated to artificially increase the octane number by lowering the tendency towards preignition.

It is another object of the invention to provide a precombustion catalytic device of the character described which is useful on the presently new generation of clean burning engines that are so designed that when new their exhaust meets the strict California standards for antipollution but which deteriorate due to carbon accumulation; the device of the present invention will, in a rather short period of running time, remove such carbon deposits and restore the engine to its clean burning factory condition.

Other objects of the invention in part will be obvious and in part will be pointed out hereinafter.

The invention accordingly consists in the features of construction, combination of elements and arrangement of parts hereinafter described and of which the scope of the application will be indicated in the appended claims.

BRIEF DESCRIPTION OF THE DRAWINGS

In the accompanying drawings in which is shown one of the various possible embodiments of the invention.

DESCRIPTION OF THE PREFERRED EMBODIMENTS

Figure 1:
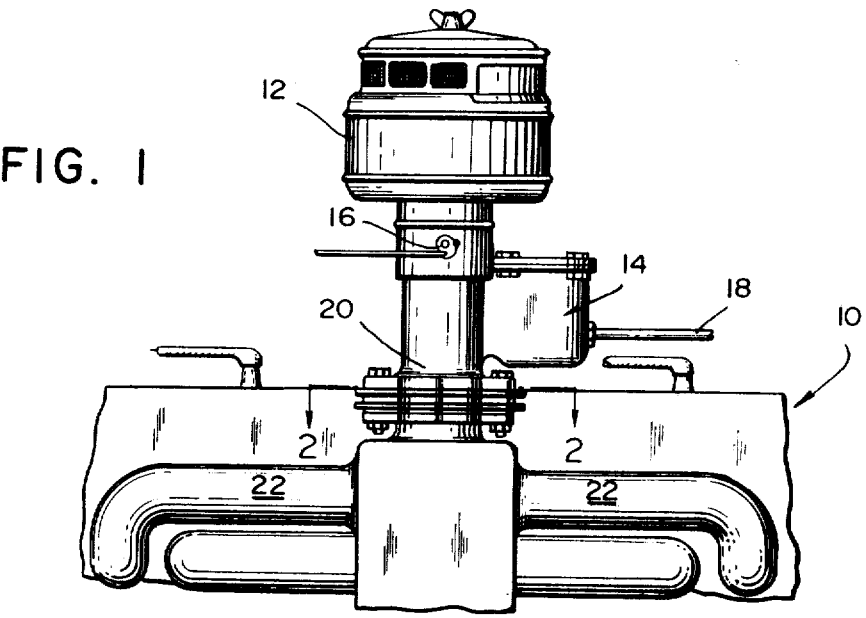
FIG. 1 is an elevational view showing the location of the precombustion catalytic device in accordance with the invention and its relation to the associated elements of a spark ignition internal combustion engine.

Referring now to FIG. 1 which illustrates the position of the precombustion catalytic device with respect to other elements of a spark ignition internal combustion engine, the reference numeral 10 denotes a standard such engine having an air filter 12 at the intake of a carburetor 14. The carburetor includes an inlet air valve control 16 and is supplied with liquid fuel through a fuel inlet conduit 18. The fuel supplied is of the type customarily utilized in everyday practice, to wit, gasoline, which is a blend principally composed of various vaporizable liquid volatilizable hydrocarbons. The blends which are employed as gasolines constitute a broad spectrum of hydrocarbons answering the foregoing general description. By way of example, it may include iso-octane, a hydrocarbon of high anti-knocking value, 100 on the octane scale, and normal heptane, a hydrocarbon of low value, 0 on the octane scale. Merely to typify how such a blend is rated insofar as octane numbers are concerned, a mixture of 10 parts of normal heptane and 90 parts of iso-octane has an octane number of 90 which would be lower than the octane number of a so-called "regular" gasoline which has an octane number of about 94. As mentioned earlier in this specification, a premium gasoline may have an octane number of about 99 to 100 and more. There are commercially available a range of different octane numbers which are conventionally characterized by different trade designations that may vary from company to company. In general, the lower the octane number, the less expensive is the gasoline and the more desirable it is to purchase.

All of these gasolines are capable of being sprayed in the form of small particles into an air stream where they will evaporate to create a mixture that is suitable for feed to the intake manifold of a spark ignition internal combustion engine.

The fuel (gasoline) and air, the fuel after reduction to minute droplets and after mixing with air and passage of the mixture to the outlet throat 20 of the carburetor 14, instead of flowing directly to the engine intake manifold 22 as in normal practice, are passed through a precombustion catalytic device 24 embodying the present invention. This device is located between the exit end of the carburetor, i.e. the outlet throat 20, and the inlet end to the engine intake, this being the inlet to the engine intake manifold 22.

The construction of the thusly placed precombustion catalytic device 24 is the subject of the present invention.

Said device consists essentially of two wire cloths 26, 28. The wire cloth 26 is above and spaced from the wire cloth 28 and is at the upstream end of the fuel/air mixture leaving the carburetor outlet throat 20. The wire cloth 28 is at the downstream end of said stream.

Each cloth includes a base wire cloth, preferably one having a good thermal conductivity and fabricated of an inexpensive suitable metal such as iron or steel. The cost of the base wire cloth is not a critical factor although it is not negligible. Availability is also an important factor. More desirable metals for the base wire cloth are copper and aluminum and alloys thereof due to their better heat conductivity. The cloths are of a very fine mesh unlike the coarse screens disclosed in United States Letters Pat. No. 2,899,949 which are 8 and 10 mesh. The mesh of the two cloths 26, 28 are at least one order of magnitude greater in number, and, therefore, lesser in size, of openings. Thus the top wire cloth 26 is typically 40 by 36 and, therefore, somewhat in excess of 1,000 openings per square inch. The bottom cloth 28 is typically of 30 by 30 mesh and thus also is in the order of 1,000 openings per inch, the openings therein accordingly being between one and two orders of magnitude smaller than the mesh openings mentioned in the aforesaid letters patent.

The range of wire cloths usable in accordance with the invention ranges from a 20 by 20 mesh to a 100 by 100 mesh with wire diameters from about 0.02 inch to about 0.01 inch for the coarsest mesh and from about 0.0045 inch to about 0.003 for the finest mesh. The percentage of open area in a direction perpendicular to the plane of the mesh may vary for the cloths from about 30% to about 60%; however, if either cloth has a percentage of open area as small as 40% or less the open area of the other screen must be at least 50%.

The two wire cloths are so treated that they present catalytic surfaces to the carbureted fuel/air mixture flowing therethrough. If desired, the cloths themselves may be made entirely of the catalytic material, as will be described, but as a matter of economy it is less expensive and just as functionally effective to employ common metals for the base metal cloths and to coat them with catalytic material pursuant to the invention. The catalytic materials employed in accordance with the invention include those which are known as hydrogen ion forming catalysts. The purpose of their use is to increase the concentration of free hydrogen ions in the fuel/air mixture fed to the engine intake. Typical such catalysts are cadmium, nickel and platinum. It has been found that coatings as thin as 0.001 inch of any of these catalytic metals applied as by electroplating or immersion to a preformed base wire cloth will function satisfactorily in accordance with the invention to achieve the desirable results heretofore and hereinafter described. Alternatively, and desirably, the catalytic coating can be plated on a base wire and the wire then drawn to its proper diameter for weaving, thus effecting a concurrent reduction in diameter of the base wire and the catalytic plating. The thickness of the plating then may be in the order of a few ten-thousandths of an inch in thickness and will still be effective for the purpose of the invention. The drawn preplated wire is used to weave a wire cloth within the parameters above stated.

Platinum is expensive even in thin layers, while cadmium and nickel have been found to be particularly active with hydrocarbons such as are present in conventional gasoline blends. Therefore, it is preferred to use cadmium and nickel, these being utilizable either as the pure elements, or in commercially pure form, or in the form of metal alloys.

Best results are obtained where the top (upstream) wire cloth is coated with cadmium and the bottom (downstream) wire cloth is coated with nickel.

The two wire cloths extend completely across the bore connecting the discharge throat of the carburetor and the entrance end of the engine intake manifold so that it is not possible for any of the fuel/air mixture to bypass these cloths—the mixture is constrained to flow through both cloths. Obviously, it is within the ambit of the invention to bypass some of the fuel/air mixture but this would lower the advantages obtained by the invention and, therefore, preferably the entire fuel/air mixture is constrained to flow through the two wire cloths in succession.

Figure 4:
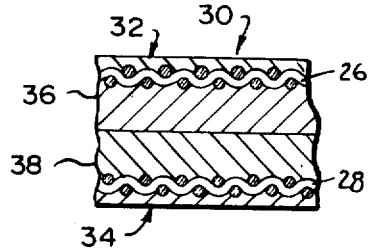
FIG. 4 is a highly enlarged view taken substantially along the line 4—4 sectional of FIG. 1.
Figure 2:
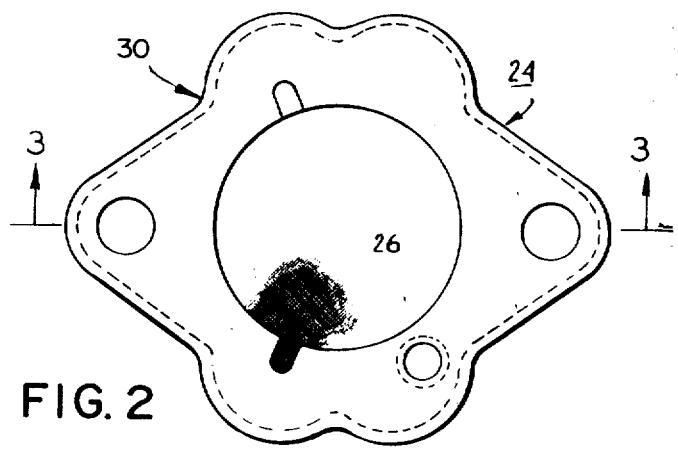
FIG. 2 is an enlarged plan view of said device taken substantially along the line 2—2 of FIG. 1.
Figure 3:
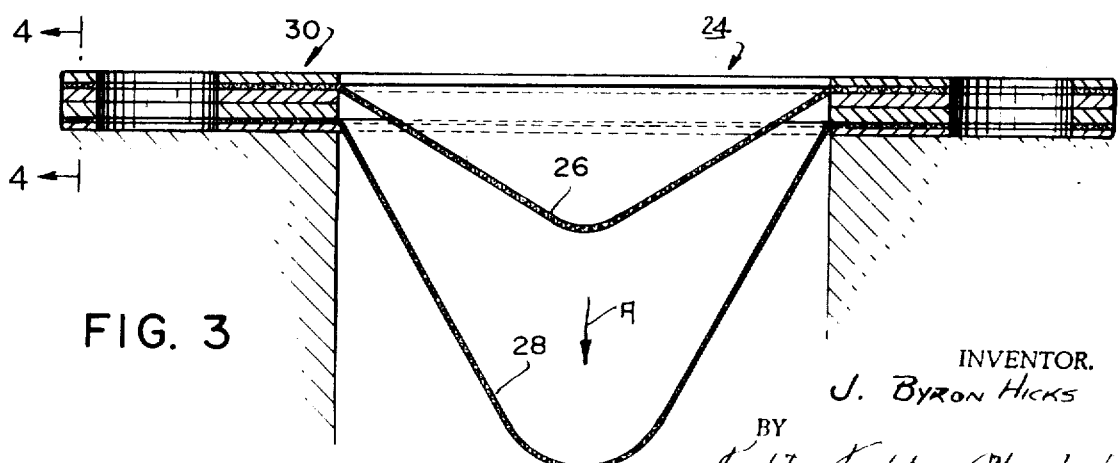
FIG. 3 is a further enlarged cross-sectional view taken substantially along the line 3—3 of FIG. 1 and showing the device in greater detail.

It is necessary for the precombustion catalytic device to include suitable means for supporting the two spaced wire cloths in their aforesaid position completely spanning the connection between the carburetor and the intake manifold and preferably to integrate the cloths into a single unit for easier handling and installation. For this purpose there is provided a gasket construction as shown in FIG. 3 and shown in more detail in FIG. 4.

Preferably the gasket construction is such that an effectively unitary gasket 30 surrounds and has imbedded therein the spaced peripheral zones of both wire cloths 26, 28 extending beyond the bore running between the carburetor outlet throat and the entrance end to the intake manifold. Actually, the gasket is composed of four initially separate and not fully cured components which are integrated and cured into the operationally unitary single gasket 30. These components are a top cover 32, a bottom cover 34, an upper half-core 36 and a lower half-core 38. The covers and half-cores preferably are of a material which can and is manufactured to be fused together under heat and pressure so as to form a unitary whole. An excellent such material is nitrile rubber which is employed in the preferred form of the present invention. That is to say, the two covers and the two half-cores are made of such rubber which is in its uncured state before their integration. This rubber when the four components are coalesced under heat and pressure cure to form a tough, rugged, durable gasket, the integrity of which is not impaired by the temperatures to which it is subjected in normal operation of the spark ignition internal combustion engine 10.

It will be observed that the peripheral zone of the upstream cloth 26 is initially located between the top cover 32 and the upper half-core 36 while the peripheral zone of the downstream cloth 28 is initially located between the bottom cover 34 and the lower half-core 38. "Initially" is used in a sense to denote the condition of the components at a time before the four components have been fused together and cured under heat and pressure in a manner well known to the art. After fusion and curing, the peripheral zones of the cloths extending beyond the connecting bore between the carburetor and intake manifold are imbedded in the finished unitary gasket 30 as is quite clearly shown in FIG. 4 and the upper and lower half-cores likewise are fused together. The remainder of the spaced wire cloths span the bore through which the carbureted fuel/air mixture flows.

The catalytic action hereinabove referred to is enhanced when the temperature of the cloths is elevated above the temperatures they normally would assume at the time of passage of the freshly vaporized fuel/air mixture therethrough. In order to elevate the cloths to such a higher temperature and thereby obtain the advantage of such higher efficiency, it is preferable for the gasket material to have a good coefficient of thermal conductivity. The coefficient of thermal conductivity is increased by incorporating in the material of the gasket, i.e. the nitrile rubber, a filler having a good coefficient of heat conduction. One typical such material is asbestos fibers. It has been found that when such a filler is incorporated as a reinforcement in the nitrile rubber, an appreciable amount of heat from the engine block flows through the metal of the fuel intake manifold and through the gasket 30 into the wire cloth.

Desirably, the thickness of the unitary gasket 30 is maintained at a minimal figure in order to encourage flow of heat and to but negligibly elevate the carburetor. Typically each cover is in the order of 0.02 inch thick and the combined thickness of the half-cores is about 0.09 inch.

The top and bottom surfaces of the gasket are flat to conform readily to the normally flat surface of the flanges at the discharge throat of the carburetor and the entrance end of the intake manifold.

The gasket is formed with suitable openings to accept the usual bolts that join the aforesaid two flanges.

The gasket is electrically non-conductive and provides a means electrically insulating both cloths from the engine and from one another to maintain effectiveness of the catalytic action. The bolt-passing holes in the cloths are slightly larger than the associated holes in the gasket to ensure that the cloths maintain their mutual insulation from the engine and from one another. For the same purpose all edges of the cloth are slightly inset from the corresponding edges of the gasket, the amount of inset being so small as not to be noticeable in FIG. 3.

It previously has been noted that the aforesaid United States Letters Patent employs wire screens which are planar, i.e. flat. Pursuant to the present invention this geometry is discarded and, in lieu thereof, each of the wire cloths is deeply dished, i.e. downwardly cupped. Various suitable configurations may be employed. For example, each of the wire cloths may be downwardly domed with a configuration such as to prevent interference between the cloths. Alternatively as is shown in FIG. 3, a somewhat more complex configuration may be employed wherein each of the wire cloths is of a generally conical configuration with a generously rounded apex pointed in the general direction of flow of the carbureted fuel/air mixture. The dishing, aside from other advantages to be mentioned, considerably increases the overall area of the wire cloth that can be interposed in a base of any given size.

In the illustrated example the upstream cloth 26 has a top diameter (the diameter of the bore and of the exposed upper end of the cloth) of 1.72 inches and has a depth of ½ an inch, the apex having a radius of 0.185 inch. The downstream cloth has a top diameter of the same size, to wit, 1.72 inches, but a depth of 1⅛ inches and a radius of curvature of 0.437 inch for the apex. In addition, there is a reversely curved fillet at the annular junction between the peripheral zone of the cloths imbedded in the gasket and the conical parts of the wire cloths to prevent any tendency for fracture or overly stress the cloths at this junction. In the example illustrated, the radius of curvature of said fillet is 0.02 inch. It should be mentioned that all of the figures above given are merely exemplificative and have been set forth in order to aid in visualizing the structure of one specific device embodying the invention; however, the invention is nowise to be considered as limited thereto.

The non-planarity of the two catalytic coated wire cloths is a principal factor in the increased efficiency of the instant invention over that of the structure shown in the aforesaid Letters Patent. One of the results obtained by the aforesaid non-planarity is that a greater area of cloth, as much as double, can be contained within a bore of a given diameter. Another result is that the actual area of catalytic surface is increased as much as 12 times over that of the structure of the aforesaid patent.

Another result is that most of the openings in the wire cloths are disposed at an angle to the direction, indicated by the arrow A, of general flow of the fuel/air mixture through the device 24. Due to this inclination, the projected areas of the openings presented to the impinging direction of flow of said mixture are materially reduced and, indeed, when taking into account the fact that the wire cloth is composed of wires of finite thickness interwoven with one another, such inclination reduces the projected area of the clear opening in the general direction of flow to zero. That is to say, the wires themselves block the openings in the general direction of flow of the arrow A. This means that the fuel/air carbureted mixture must follow tortuous, i.e. convoluted, paths as it flows into impingment with and around the catalytically coated wires of the cloths. Such modified flow of the mixture as it passes through the cloths causes the mixture to have a more prolonged contact with the catalytically coated wire surfaces than does a mixture in the aforesaid United States Letters Patent.

Furthermore, the more tortuous flow of the fuel/air mixture through the two cloths sets up turbulence in the mixture as it passes through each cloth and, due to this turbulence, the mixture experiences various changes in direction of flow rather than a smooth flow so, as a consequence, it will scrub against these catalytic surfaces. This scrubbing action insures an excellent degree of contact and, therefore, a higher degree of hydrogen ion formation, increases the concentration of such ions, and thereby better preconditions the combustible mixture.

An additional factor which arises from the scrubbing action is that the scrubbing lessens the thickness of the catalytic-impeding static gaseous boundaries existing at the surfaces of the catalytically coated wire cloths. Such a static boundary (film) invariably is present wherever a stream of gas flows past and in contact with a stationary solid object. This static boundary inhibits good contact between the flowing gas and the stationary solid object; but by virtue of the scrubbing action the aforesaid static boundary is considerably reduced in thickness whereby a more intimate contact is obtained between the fuel/air mixture and the catalysts on the surface of the wire cloths themselves, thereby further enhancing the production of free hydrogen ions and increasing the concentration thereof at the exit end of the device 24.

Hence, said device 24, by virtue of the use of catalytically coated wire cloths with fine openings and the use of catalytically coated wire cloths of a nonplanar configuration, has realized a much heightened degree of effectiveness which is manifested in actual operation of spark ignition internal combustion engine embodying the present invention.

Several tests were run with the precombustion catalyst described above. One of these was on a C.F.R. (Cooperative Fuel Research Committee) engine of an overhead valve variable compression type with a bore of 3¼ inches and a stroke of 4¼ inches. This is a standard engine used by the petroleum industry for setting up test conditions to determine the octane number of motor fuels. The octane number as used by the industry refers to the detonation tendency of the fuel; the higher the number, the less likely the fuel will cause detonation. The engine was set to run properly on a 100 octane fueling. The engine was initially allowed to accumulate carbon deposits in the combustion chamber to the point where preignition occurred. The precombustion device was then installed and the engine was tested with two fuels, one being Esso Extra, a premium fuel, and the other a 100 octane reference fuel constituting iso-octane. Using both of these fuels with the precombustion device installed, preignition continued through the five seven-hour days of operation when it ceased. The noise level of the preignition continuously decreased throughout this period. At the end of the fifth day, a 94 octane fuel was introduced in place of the 100 octane fuel. Preignition again was noted but the noise level of the preignition was essentially the same as the noise level of the preignition using the 100 octane fuel at the beginning of the first day. This indicated an order of magnitude in reduction of octane requirements by six octane numbers over a period of five days.

Eleven vehicles were tested on the road, ten with precombustion devices pursuant to the present invention installed, and one reference vehicle. These vehicles were privately owned and were driven daily in normal service. The vehicles tested represented a wide selection of manufacturers, model types and production years. The ten vehicles were as follows, in each instance data being given as to engine displacement, factory compression ratio, type of carburetor and odometer mileage, this latter figure being taken as an indication of the amount of unburned carbon deposits that had accumulated in the combustion chamber of the engines, the greater the mileage, the greater the carbon deposit:

1957 Chevrolet two-door hardtop:
  engine displacement: 283 cu. in. (V–8)
  compression ratio: 8.5:1
  carburetor: 2-barrel
  odometer mileage: 99,877
1962 Citroen DS 19 four-door sedan:
  engine displacememt: 116 cu. in. (4 cylinder)
  compression ratio: 8.5:1
  carburetor: 2-barrel (1 primary, 1 secondary throat)
  odometer mileage: 63,097
1963 Pontiac Tempest four-door station wagon:
  engine displacement: 195 cu. in. (4 cylinder)
  compression ratio: 8.6:1
  carburetor: 1-barrel
  odometer mileage: 57,934
1966 Chevrolet Malibu four-door sedan:
  engine displacement: 283 cu. in. (V–8)
  compression ratio: 8.5:1
  carburetor: 2-barrel
  odometer mileage: 30,556
1968 Lincoln Continental four-door hardtop:
  engine displacement: 460 cu. in. (V–8)
  compression ratio: 10.5:1
  carburetor: 4-barrel
  odometer mileage: 55,284
1968 Dodge Monaco four-door station wagon:
  engine displacement: 383 cu. in. (V–8)
  compression ratio: 9.2:1
  carburetor: 2-barrel
  odometer mileage: 19,327
1969 Plymouth Fury four-door sedan:
  engine displacement: 383 cu. in. (V–8)
  compression ratio: 9.2:1
  carburetor: 2-barrel
  odometer mileage: 22,075
1969 Dodge (taxi) four-door sedan:
  engine displacement: 225 cu. in. (6 cylinder)
  compression ratio: 8.4:1
  carburetor: 1-barrel
  odometer mileage: 27,592
1969 Oldsmobile Delta 88 two-door hardtop:
  engine displacement: 455 cu. in. (V–8)
  compression ratio: 10.25:1
  carburetor: 4-barrel
  odometer mileage: 7,278
1969 Ford LTD four-door station wagon:
  engine displacement: 429 cu. in. (V–8)
  compression ratio: 10.5:1
  carburetor: 2-barrel
  odometer mileage: 5,565

The reference vehicle was a 1966 Pontiac GTO two-door sedan with an engine displacement of 389 cu. in. (V–8), a compression ratio of 10.75:1, a four-barrel carburetor and an odometer mileage of 51,556.

All of the vehicles at the start of the test experienced preignition when fed with fuel recommended by the manufacturers for the engines when new. The reference vehicle did not change its mode of operation throughout the entire test period which extended over one month. When the precombustion devices were installed in the ten test vehicles, they all continued to experience preignition. However, the noise level of the preignition progressively lowered as the test vehicles were driven with the same fuel and the preignition disappeared in from 1,000 to 3,000 miles. To ascertain the lowered octane number requirements of the engines, gasoline was fed having a lowered minimum octane number sufficient to reach a noise level approximately the same as the noise level that was experienced at the start of the runs. The reduction in octane number averaged six. The lowest reduction recorded in octane number was 5 and the highest was 11.

The readings of carbon monoxide in the exhaust gases of engines equipped with the new preconditioner indicated that there was a lowering of carbon monoxide. The engines of tested vehicles embodying the present invention have been taken apart and it was observed that the combustion chambers were free of carbon, this absence of carbon being attributable only to the incorporation of the new precombustion device. The vehicle which experienced the maximum reduction in octane number was the 1969 Ford.

Tests conducted on spark ignition internal combustion automobile engines utilizing the precombustion device of the present invention have further shown that the amount of unburned hydrocarbon in the exhaust gases was quite low, a reduction being experienced immediately upon installation of the precombustion device and increasing thereafter. Typically the hydrocarbon content of the exhaust gases using the aforesaid precombustion device averaged about 55 parts per million calculated as hexane, this being an extremely low figure, sufficiently low not to present the serious health hazard which presently is encountered in metropolitan areas and, indeed, is lower than the unburned carbon content of automobile engines of a similar nature equipped with anti-pollutant and smog-abatement reducing devices such as after-burners. It should be observed that the presently proposed standard for the state of California of unburned hydrocarbon on a hexane basis is 275 parts per million and a carbon monoxide equivalent less than 1.5%. Using the precombustion device of the present invention the carbon monoxide content is well within this requirement, at cruise being 0.25% and at idle 2.1% or about 0.5% for the total cycle. It will be recognized, of course, that California is one of the most active states in attempting to solve the pollutant and smog-abatement problems.

The present invention has the very substantial advantage of being quite inexpensive to make and install and represents a very substantial saving to the motoring public in initial investment, annual maintenance and cost of fuel.

As in the case of the aforesaid Letters Patent, the present invention solves these problems by treating the gasoline before ignition rather than operating upon exhaust gases; that is to say, it treats the problem at its source before combustion takes place, thereby eliminating the formation of carbon deposits in the combustion chamber and the formation of carbon deposits which would foul the spark plugs. Moreover, the present device removes previously formed carbon deposits over approximately one month of use and enables a substantially lower grade of fuel to be used or the timing to be advanced or the fuel/air mixture to be made leaner, all of which reduce pollutants, reduce spark plug maintenance and increase gasoline mileage.

It will be appreciated by a worker skilled in the art that spark plug fouling alone can increase the unburned hydrocarbon content of exhaust gases five-fold so that by using the present precombustion device, existing fouling of spark plugs will be cleaned up and no further deposits will be made on the spark plugs, thereby additionally increasing the reduction of undesired contaminants in the engine exhaust gases. This is a distinct advantage over previous systems which relied upon after-burners and devices that have changed the ignition timing for combatting the same problems.

A substantial reduction in the size of the mesh openings below the size indicated in the aforesaid Letters Patent is of critical importance in accordance with the instant invention, the reduction in mesh size being to the range hereinbefore mentioned, with wire diameters and percentages of clear areas as stated hereinbefore. Of course, the wire cloths are non-planar, being preferably dished, and desirably dished in a direction away from the carburetor and toward the engine intake. Although the reverse method of dishing, i.e. upward doming, would function satisfactorily, such construction in many instances would require the installation of a tubular coupling between the carburetor and intake manifold in order to clear the butterfly valve of the carburetor. With the direction of dishing as shown, such drawback is avoided.

It also is within the scope of the present invention to employ any foraminous support material coated with catalytic metal as aforementioned, provided that the sizes of the openings are of the same order as those previously indicated, i.e. in a wire cloth of between about 20 by 20 and 100 by 100 mesh, with wire diameters and percentages of open area as specified above. Such alternate foraminous materials include a thin metal fiber bat such as felted metal fibers with interstices of the foregoing order or a sintered powdered metal device having like sized interstices. It should be mentioned that when using such other types of catalytically coated interstitial base supports the same should be non-planar, i.e. dished, in the fashion described at length hereinabove.

It thus will be seen that there is provided a precombustion catalytic device for use in a spark ignition internal combustion engine employing a vaporizable liquid hydrocarbon fuel which device achieves the several objects of this invention and is well adapted to meet the conditions of practical use.

As various possible embodiments might be made of the above invention and as various changes might be made in the embodiment above set forth, it is to be understood that all matter herein described or shown in the accompanying drawings is to be interpreted as illustrative and not in a limiting sense.

Having thus described the invention, there is claimed as new and desired to be secured by Letters Patent:

1. A precombustion catalytic device for use in a spark ignition internal combustion engine employing a vaporizable liquid hydrocarbon fuel which is carbureted with air prior to combustion, said device being adapted to be interposed between a carburetor and an intake passageway to the engine, said device comprising a foraminous member with a catalytic surface, the sizes of the openings in said member not exceeding those of a 20 by 20 mesh wire cloth with a percentage of open area between about 30 and 60 and said member being dished so as to orient the majority of the openings in said member at an angle to the line of flow of a carbureted fuel/air mixture from the carburetor to the engine intake and thus cause the mixture to move in a tortuous path through the member to create a turbulent flow and to scrub the member so as to minimize the thickness of the static boundary layer at the surface thereof and means electrically insulating the device from the engine.

2. A device as set forth in claim 1 wherein the sizes of the openings in the member do not exceed those of a 100 by 100 mesh wire cloth.

3. A device as set forth in claim 1 wherein the catalytic surface is composed of a metal selected from the class consisting of cadmium, nickel and platinum.

4. A device as set forth in claim 1, including an electrically non-conductive support element in which the peripheral zone of the foraminous member is imbedded.

5. A device as set forth in claim 4 wherein the support element is composed of a material having a good coefficient of thermal conductivity.

6. A device as set forth in claim 4 wherein the support element is a gasket having a filler of good thermal conductivity.

7. A device as set forth in claim 6 wherein the gasket has a matrix of an elastomer.

8. A device as set forth in claim 7 wherein the elastomer is nitrile rubber.

9. A device as set forth in claim 1 constituting a stack of at least two foraminous members spaced from one another in the direction of flow of the fuel/air mixture therethrough.

10. A device as set forth in claim 9 wherein the catalytic surfaces of the two members are different metals.

11. A device as set forth in claim 10 wherein the metal of the upstream wire cloth is cadmium and the metal of the downstream wire cloth is nickel.

12. A device as set forth in claim 1 wherein the member is wire cloth.

13. A device as set forth in claim 12 wherein the inclination of the major portion of the member is such that there are no clear openings presented by the member perpendicular to the general line of flow of the mixture thru the device, the wires of the member blocking said openings in said direction of flow.

14. A device as set forth in claim 1 wherein the foraminous member is of conical configuration with a rounded apex.

15. A device as set forth in claim 1 wherein the foraminous member is composed of a base metal coated with a hydrogen ion forming catalyst.

16. A precombustion catalytic device for use in a spark ignition internal combustion engine employing a vaporizable liquid hydrocarbon fuel which is carbureted with air prior to combustion, said device being adapted to be interposed between a carburetor and an intake passageway to the engine, said device comprising a foraminous member with a catalytic surface dished so as to orient the majority of the openings in said member at an angle to the line of flow of a carbureted fuel/air mixture from the carburetor to the engine intake and thus cause the mixture to move in a tortuous path through the member to create a turbulent flow and to scrub the member so as to minimize the thickness of the static boundary layer at about 30 and 60 and means electrically insulating the device from the engine.

17. A precombustion catalytic device for use in a spark ignition internal combustion engine employing a vaporizable liquid hydrocarbon fuel which is carbureted with air prior to combustion, said device being adapted to be interposed between a carburetor and an intake passageway to the engine, said device comprising a foraminous member with a catalytic surface, the sizes of the openings in said member not exceeding those of a 20 by 20 mesh wire cloth with a percentage of open area between about 30 and 60 and means eletrically insulating the device from the engine.

18. A precombustion catalytic device for use in a spark ignition internal combustion engine employing a vaporizable liquid hydrocarbon fuel which is carbureted with air prior to combustion, said device being adapted to be interposed between a carburetor and an intake passageway to the engine, said device comprising a foraminous member with a catalytic surface, said member being of a planar configuration so as to orient the majority of the openings in said member at an angle to the line of flow of a carbureted fuel/air mixture from the carburetor to the engine intake and thus cause the mixture to move in a tortuous path through the member to create a turbulent flow and to scrub the member so as to minimize the thickness of the static boundary layer at the surface thereof and means electrically insulating the device from the engine.

19. A precombustion catalytic device for use in a spark ignition internal combustion engine employing a vaporizable liquid hydrocarbon fuel which is carbureted with air prior to combustion, said device being adapted to be interposed between a carburetor and an intake passageway to the engine, said device comprising at least two foraminous members each having a catalytic surface, said members being spaced apart in the direction of flow of the carbureted mixture of fuel and air therethrough and an electrically non-conductive support element for said members, the peripheral zones of both said members being imbedded in said support element whereby to form a unitary multi-member catalytic device.

20. A device as set forth in claim 19 wherein the catalytic surface is composed of a metal selected from the class consisting of cadmium, nickel and platinum.

21. A device as set forth in claim 19 wherein the catalytic surfaces of the different members are composed of different metals, that of the upstream member being cadmium and that of the downstream member being nickel.

22. A device as set forth in claim 19 wherein the members are dished in the same direction.

23. A device as set forth in claim 22 wherein the sizes of the openings in the members do not exceed those of a 20 by 20 mesh with a percentage of open area between about 30 and 60 and are not less than those of a 100 by 100 mesh wire cloth.

24. A precombustion catalytic device for use in a spark ignition internal combustion engine employing a vaporizable liquid hydrocarbon fuel which is carbureted with air prior to combustion, said device being adapted to be interposed between a carburetor and an intake passageway to the engine, said device comprising a foraminous member with a catalytic surface, said member being of a planar configuration so as to increase the overall area of the member over that of a planar member for an intake passageway of the same size and means electrically insulating the device from the engine.

References Cited

UNITED STATES PATENTS

| | | | |
|---|---|---|---|
| 2,701,557 | 2/1955 | Ramey | 48—180 X |
| 2,899,949 | 8/1959 | Hicks | 48—180 X |

MORRIS O. WOLK, Primary Examiner

R. E. SERWIN, Assistant Examiner

U.S. Cl. X.R.

48—180 C; 123—119 E

PO-1050
(5/69)

UNITED STATES PATENT OFFICE
CERTIFICATE OF CORRECTION

Patent No. 3,682,608      Dated    August 8, 1972

Inventor(s) J. B. Hicks

It is certified that error appears in the above-identified patent and that said Letters Patent are hereby corrected as shown below:

Column 12, line 63, and Column 14, line 8, change "a planar" to -- aplanar -- .

Signed and sealed this 10th day of September 1974.

(SEAL)
Attest:

McCOY M. GIBSON, JR.             C. MARSHALL DANN
Attesting Officer               Commissioner of Patents